United States Patent
Takada et al.

(10) Patent No.: US 10,584,757 B2
(45) Date of Patent: Mar. 10, 2020

(54) FRICTION MATERIAL

(71) Applicant: AKEBONO BRAKE INDUSTRY CO., LTD., Chuo-ku, Tokyo (JP)

(72) Inventors: Takuya Takada, Tokyo (JP); Hiroshi Tokumura, Tokyo (JP); Toru Kawata, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 15/778,279

(22) PCT Filed: Nov. 22, 2016

(86) PCT No.: PCT/JP2016/084679
§ 371 (c)(1),
(2) Date: May 23, 2018

(87) PCT Pub. No.: WO2017/090633
PCT Pub. Date: Jun. 1, 2017

(65) Prior Publication Data
US 2018/0355935 A1    Dec. 13, 2018

(30) Foreign Application Priority Data
Nov. 27, 2015 (JP) ................................. 2015-231594

(51) Int. Cl.
*F16D 69/02* (2006.01)

(52) U.S. Cl.
CPC .... *F16D 69/026* (2013.01); *F16D 2200/0065* (2013.01); *F16D 2200/0073* (2013.01)

(58) Field of Classification Search
CPC ........... F16D 69/026; F16D 2200/0065; F16D 2200/0073
See application file for complete search history.

(56) References Cited

U.S. PATENT DOCUMENTS

| | | | | |
|---|---|---|---|---|
| 7,914,871 | B2 * | 3/2011 | Unno | .................... F16D 69/026 106/36 |
| 9,932,264 | B2 * | 4/2018 | Iwata | ...................... C03C 13/00 |
| 2010/0084232 | A1 | 4/2010 | Subramanian | |
| 2010/0233464 | A1 | 9/2010 | Unno | |
| 2011/0297496 | A1 | 12/2011 | Subramanian | |
| 2012/0070680 | A1 | 3/2012 | Unno et al. | |
| 2012/0100983 | A1 | 4/2012 | Yonaiyama et al. | |
| 2013/0096228 | A1 | 4/2013 | Yamamoto et al. | |
| 2013/0240310 | A1 | 9/2013 | Baba et al. | |
| 2014/0202805 | A1 | 7/2014 | Unno et al. | |
| 2014/0227541 | A1 | 8/2014 | Unno et al. | |
| 2015/0008615 | A1 | 1/2015 | Unno et al. | |
| 2015/0369320 | A1 | 12/2015 | Onda et al. | |
| 2016/0160951 | A1 | 6/2016 | Hattori et al. | |
| 2016/0245353 | A1 | 8/2016 | Hanaie et al. | |
| 2016/0265612 | A1 | 9/2016 | Unno et al. | |
| 2016/0273604 | A1 * | 9/2016 | Miyaji | .................. F16D 69/026 |
| 2016/0289126 | A1 | 10/2016 | Kitami et al. | |
| 2017/0248186 | A1 | 8/2017 | Hattori et al. | |

FOREIGN PATENT DOCUMENTS

| | | |
|---|---|---|
| CN | 103881657 A | 6/2014 |
| JP | S56-16578 A | 2/1981 |
| JP | 2007-218395 A | 8/2007 |
| JP | 2010-077341 A | 4/2010 |
| JP | 2011-16877 A | 1/2011 |
| JP | 2012-255053 A | 12/2012 |
| JP | 2014-167076 A | 9/2014 |
| JP | 2014-527566 A | 10/2014 |
| JP | 2015-028176 A | 2/2015 |
| JP | 2015-93934 A | 5/2015 |
| JP | 2015-93936 A | 5/2015 |
| JP | 2016-79250 A | 5/2016 |
| WO | WO-2011-158917 A1 | 12/2011 |
| WO | WO-2012/49858 A1 | 4/2012 |
| WO | WO-2012-066964 A1 | 5/2012 |
| WO | WO-2012-066965 A1 | 5/2012 |
| WO | WO-2013/048627 A1 | 4/2013 |
| WO | WO-2013/180315 A1 | 12/2013 |
| WO | WO-2014-112440 A1 | 7/2014 |
| WO | WO-2015072440 A1 * | 5/2015 ........... F16D 69/026 |

OTHER PUBLICATIONS

International Search Report and Written Opinion dated Jan. 10, 2017 for PCT/JP2016/084679 [non-English language].
International Search Report dated Jan. 10, 2017 for PCT/JP2016/084679, including English translation.
Extended European Search Report dated May 23, 2019 in European Patent Application No. 16868576.6.
Notice of Reasons for Refusal dated Oct. 8, 2019 in Japanese Patent Application No. 2015-231594 (3 pages) with an English Translations (6 pages).
The First Office Action dated Nov. 29, 2019 in Chinese Patent Application No. 201680069544.0 (7 pages) with an English translation (7 pages).

* cited by examiner

*Primary Examiner* — Anthony J Green
(74) *Attorney, Agent, or Firm* — Drinker Biddle & Reath LLP

(57) ABSTRACT

A friction material includes a bio-soluble inorganic fiber and a metal sulfide. A content of the bio-soluble inorganic fiber based on the friction material is 7% by volume or more. The friction material includes no copper component and no metal fiber. The friction material may further include zinc.

8 Claims, No Drawings

FRICTION MATERIAL

TECHNICAL FIELD

The present invention relates to a friction material, and particularly to a friction material for a vehicle brake which is for use in brake pads or brake linings, clutches and the like for automobiles, railway vehicles, industrial machines and the like.

BACKGROUND ART

A friction material to be used for brakes such as disc brakes and drum brakes, clutches or the like is composed of raw materials such as a fiber base material for exerting a reinforcing function, a friction modifier for imparting a friction function and adjusting its friction performance and a binder for integrating these components.

With recent high-performance and speeding-up of vehicles, the role of brakes has become increasingly severe, and it is necessary to have a sufficiently high friction coefficient (effectiveness). Further, the temperature increases during braking at high speed, different from a frictional state during braking at low temperature and low speed, so that stable frictional properties having small changes in friction coefficient due to changes in temperature have been desired.

At present, it has been conventional that incorporation of an appropriate amount of metal fiber into a general friction material is effective for reinforcing the strength of the friction material, stabilizing the friction coefficient thereof, further maintaining the friction coefficient and improving a heat radiation effect at high temperature, improving abrasion resistance, and the like. Patent Document 1 discloses a friction material containing 5 to 10% by mass of a steel fiber, 5 to 10% by mass of a copper fiber having an average fiber length of 2 to 3 mm, and 2 to 5% by mass of a zinc powder having a particle diameter of 5 to 75 μm.

According to Patent Document 1, when the friction material contains the copper fiber in an amount within a given range, the friction coefficient at low temperature can be improved, and a decrease in friction coefficient at high temperature and high speed can be avoided. As the mechanism for this, it is assumed that during friction between the friction material and a counterpart material (disc rotor), an adhesion coating film is formed on a surface of the counterpart material due to the extensibility of the metal fiber contained in the friction material, and acts as a protective film, thereby largely contributing to stabilizing the friction coefficient at low temperature and maintaining the high friction coefficient at high temperature.

At present, therefore, the metal component contained in the friction material is mainly metal fiber such as a steel fiber or a copper fiber, in many cases. When these fibers are contained in large amounts, there is a possibility to cause abnormal wear of the above-mentioned disc rotor. That is, a wear debris of the disc rotor or a metal component contained in the friction material of the brake pad is incorporated into the friction material and aggregates therein to form large metal masses, which remain between the brake pad and the disc rotor, in some cases. The metal masses thus formed by aggregation sometimes abnormally wear the disc rotor (Patent Document 2).

Further, the copper component contained in the friction material is discharged as a wear debris by braking, so that the influence thereof on the natural environment has been pointed out.

Then, as a friction material containing no copper, Patent Document 3 discloses that even when the copper content is 0.5% by mass or less, all of high abrasion resistance during braking at high temperature, ensuring of a stable friction coefficient, and noise resistance are achieved by containing partially-graphitized coke and muscovite in given amounts in the friction material. In addition, Patent Document 4 discloses that even when the copper content is 0.5% by mass or less, it is possible to exhibit a stable friction coefficient and abrasion resistance and reduce squealing after leaving in a cold environment by allowing fluorine-based polymer particles to be contained in a friction material composition.

Patent Document 5 discloses that even when the content of copper and metal fiber other than copper is equal to or less than a predetermined value, a friction material having an excellent abrasion resistance at high temperature and little formation of metal catch is obtained by containing a titanate in a specific amount and further containing a zinc powder, in a friction material composition.

PRIOR ART DOCUMENTS

Patent Documents

Patent Document 1: JP-A-2010-77341
Patent Document 2: JP-A-2007-218395
Patent Document 3: JP-A-2015-93934
Patent Document 4: JP-A-2015-93936
Patent Document 5: JP-A-2012-255053

SUMMARY OF THE INVENTION

Technical Problems

As described above, for the purposes of decreasing the abnormal wear of the counterpart material (disc rotor) and reducing an environmental load, friction materials containing no copper component have been variously investigated. However, the abrasion resistance during braking at high temperature and high speed and the friction coefficient in the friction materials containing no copper component are not sufficient yet, and it is demanded to maintain the friction coefficient and improve the abrasion resistance at high temperature and high speed, in the case where driving operation is performed at higher speed.

The present invention has been made in views of the above circumstances, and an object thereof is to provide a friction material containing both no copper component and no metal fiber, which has an excellent friction coefficient and excellent abrasion resistance at high temperature and high speed.

Solution to Problems

The present inventors have found that even when both no copper and no metal fiber are contained, the problems are solved in a good balance by containing a bio-soluble inorganic fiber in an amount equal to or more than the predetermined amount, and a metal sulfide, respectively, thus leading to completion of the present invention.

That is, the present invention solves the above problem(s), and provides the following constitutions.

(1) A friction material comprising a bio-soluble inorganic fiber in an amount of 7% by volume or more and a metal sulfide, and comprising no copper component and no metal fiber.

(2) The friction material according to the above (1), further comprising zinc.

(3) The friction material according to the above (1) or (2), wherein the bio-soluble inorganic fiber is at least one kind selected from the group consisting of $Al_2O_3$—$SiO_2$—$ZrO_2$—$K_2O$-based fiber, $SiO_2$—$CaO$—$MgO$-based fiber, $SiO_2$—$MgO$—$CaO$—$SrO$-based fiber, and $SiO_2$—$Al_2O_3$—$CaO$—$MgO$—$K_2O$—$Na_2O$—$FeO$-based fiber.

(4) The friction material according to any one of the above (1) to (3), wherein an amount of a shot having a particle diameter of 45 μm or more in the bio-soluble inorganic fiber is 30% by weight or less.

(5) The friction material according to any one of the above (1) to (4), wherein the metal sulfide is at least one kind selected from the group consisting of tin sulfide, bismuth sulfide, molybdenum disulfide and antimony trisulfide.

Advantageous Effects of the Invention

In the present invention, a well-balanced friction material having both an excellent friction coefficient and excellent abrasion resistance in braking at high temperature and high speed can be obtained without blending a copper component and metal fiber which cause environmental pollution or abnormal wear of a disc rotor.

That is, a friction material matrix is reinforced by containing a bio-soluble inorganic fiber in an amount equal to or more than the predetermined amount to improve heat resistance, thereby ensuring the stable friction coefficient and the abrasion resistance. In addition, a coating film is formed on an interface where a friction material and a counter material are in friction with each other by containing a metal sulfide, and ploughing friction or fracture wear is avoided, which makes it possible to achieve both the friction coefficient and the abrasion resistance in braking at high temperature and high speed.

DESCRIPTION OF EMBODIMENTS

The present invention is described in detail below, but the present invention is not limited to the following embodiments and can be implemented by arbitrarily making modifications therein without departing from the gist of the present invention.

In this description, numerical ranges expressed by inserting "to" therebetween are used to encompass the values before and after "to" as a lower limit value and an upper limit value. Further, in this description, the phrase "containing no copper component" means that none of copper fiber, copper powder, cupper-containing alloy (such as brass or bronze) and compound thereof are incorporated as a raw material of a friction material, and means that the content thereof is 0.5% by weight or less which is a value defined by the regulation on the usage of copper from 2025 in the North America. In addition, the phrase "containing no metal fiber" means that the content of metal fiber such as a steel fiber or a copper fiber is 0.5% by weight or less.

<Friction Material>

A friction material in the present invention contains a bio-soluble inorganic fiber in an amount of 7% by volume or more and a metal sulfide, and contains no copper component and no metal fiber.

In addition, the friction material in the present invention preferably further contains zinc.

[Bio-Soluble Inorganic Fiber]

In the present invention, the bio-soluble inorganic fiber is used as a friction material matrix. That is, the bio-soluble inorganic fiber has been blended mainly for the purpose of removing rust due to rainwater or saltwater. In the present invention, however, the bio-soluble inorganic fiber is used as a basic structure of the friction material. The content of the bio-soluble inorganic fiber is therefore required to be 7% by volume or more based on the friction material, and is preferably 10% by volume or more based on the friction material.

On the other hand, when the content of the bio-soluble inorganic fiber is too large, attacking properties against a disc rotor increase. The content thereof is therefore preferably less than 30% by volume, more preferably 25% by volume or less, and still more preferably 20% by volume or less.

When the content of the bio-soluble inorganic fiber based on the friction material is expressed as percent by weight, the content of the bio-soluble inorganic fiber is required to be 6% by weight or more, and preferably 9% by weight or more. In addition, as the upper limit thereof, it is preferably less than 29% by weight, more preferably 23% by weight or less, and still more preferably 18% by weight or less.

The bio-soluble inorganic fiber (low bio-persistent fiber) is an inorganic fiber having a feature that even when incorporated into a human body, it is eliminated from the body in a short period of time by physiological functions. The bio-soluble inorganic fiber means an inorganic fiber satisfying that the total amount of alkali metal oxides and alkaline earth metal oxides (the total amount of oxides of sodium, potassium, calcium, magnesium and barium) is 18% by mass or more in a chemical composition thereof, and that the mass half-life of the fiber having a length of longer than 20 μm is less than 10 days in a respiratory short-term biodurability test, or that the mass half-life of the fiber having a length of longer than 20 μm is less than 40 days in a short-term biodurability test at the time of intratracheal injection, or that there is no evidence of excessive carcinogenicity in an intraperitoneal test, or that there is no relating pathogenicity or tumor occurrence in a long-term respiration test (Note Q of EU Commission Directive 97/69/EC (exclusion from application of carcinogenicity)).

Such a bio-soluble inorganic fiber preferably contains at least one kind selected from the group consisting of $SiO_2$, MgO and SrO as a chemical composition thereof, and more preferably contains at least one kind of bio-soluble inorganic fiber selected from the group consisting of $Al_2O_3$—$SiO_2$—$ZrO_2$—$K_2O$-based fiber, $SiO_2$—$CaO$—$MgO$-based fiber, $SiO_2$—$MgO$—$CaO$—$SrO$-based fiber and $SiO_2$—$Al_2O_3$—$CaO$—$MgO$—$K_2O$—$Na_2O$—$FeO$-based fiber. When plural kinds of bio-soluble inorganic fibers are used, the total amount thereof preferably falls within the above-mentioned range.

Although such a bio-soluble inorganic fiber is produced by fiber formation of a raw material of the inorganic fiber by a commonly used melt spinning process or the like, it is possible to use, for example, commercially available products such as Superwool (registered trade mark) fiber (manufactured by Morgan Advanced Materials PLC), Roxul (registered trade mark) 1000 fiber (manufactured by Lapinus B.V.), FINE FLEX (registered trade mark)-E BULK FIBER-T (manufactured by Nichias Corporation), or BIO-STAR BULK FIBER (manufactured by ITM Co., Ltd.).

The bio-soluble inorganic fiber has preferably a fiber diameter of 0.1 to 10 μm and a fiber length of 1 to 1000 μm, and more preferably a fiber diameter of 0.2 to 6 μm and a fiber length of 10 to 850 μm. The effects of the present invention can be effectively exhibited within these ranges.

Further, in general, the bio-soluble inorganic fiber which can be used in the present invention generates shots (granulated substances) which have not been formed into the fiber in the production process, and these shots are contained in the fiber. When the shot content is large, the attacking properties against the disc rotor increase. Therefore, the content of the shots having a particle diameter of 45 μm or more in the bio-soluble inorganic fiber is preferably 30% by weight or less, and more preferably 25% by weight or less.

It is also possible to separate the bio-soluble inorganic fiber from the shots in the production process of the bio-soluble inorganic fiber, and thereafter, to blend both at any rate.

Further, the bio-soluble inorganic fiber may be surface-treated with a silane coupling agent or the like on a surface thereof.

[Metal Sulfide]

In the present invention, the metal sulfide plays a role as a high-temperature lubricant. That is, a coating film is formed on an interface where the friction material and a counter material are in friction with each other, and ploughing friction and fracture wear can be avoided. In particular, graphite as a conventional lubricant does not function during braking at high temperature. However, the metal sulfide can achieve both the good friction coefficient and the abrasion resistance even during braking at high temperature and high speed.

The metal sulfide has good lubricity and sufficiently exhibits the effect even in a small amount. The content of the metal sulfide is preferably 1% by volume or more in the friction material, and more preferably 3% by volume or more in the friction material.

On the other hand, when the content thereof is too large, the lubricity is excessively improved to cause deterioration of friction properties in some cases. Therefore, the content thereof is preferably less than 10% by volume, more preferably 7% by volume or less, and still more preferably 6% by volume or less. However, in the case where the main purpose thereof is high load braking, the content thereof may be 10% by volume or more.

Preferred specific examples of the metal sulfides include tin sulfide, bismuth sulfide, molybdenum disulfide and antimony trisulfide, and one kind thereof may be used, or two or more kinds thereof may be used in combination. When two or more kinds thereof are used in combination, the total amount thereof preferably falls within the above-mentioned range.

[Zinc]

The friction material in the present invention preferably contains zinc in addition to the above-mentioned metal sulfide. As in the metal sulfide, zinc forms a coating film on the interface where the friction material and the counter material are in friction with each other, and ploughing friction and fracture wear are avoided, which makes it possible to achieve both the friction coefficient and the abrasion resistance in braking at high temperature and high speed.

The shape of zinc is preferably a powder from the standpoint of film forming properties, and more preferably particles having an average particle diameter of 1 to 10 μm.

When the content of zinc in the friction material is too small, a good coating film is hard to be formed. Therefore, the content thereof is preferably 0.2% by volume or more, and more preferably 0.5% by volume or more. In addition, the melting point of zinc is as low as about 420° C., so that when zinc is added too much, the friction coefficient during braking at high temperature decreases, and further, transfer adhesion to the counterpart material excessively occurs. Therefore, the content of zinc is preferably less than 5% by volume, more preferably 3% by volume or less, and still more preferably 2% by volume or less.

[Other Components]

As components to be used in addition to the above, a conventional binder, friction modifier and fiber base material can be blended.

[Binder]

In the friction material in the present invention, a binder which is usually used can be used. Examples of such binders include thermosetting resins such as elastomer-modified phenol resins, phenol resins (including straight phenol resins and various modified phenol resins), melamine resins, epoxy resins, polyimide resins and the like. Examples of the various modified phenol resins include hydrocarbon resin-modified phenol resins, epoxy-modified phenol resins and the like.

In the elastomer-modified phenol resin, an elastomer for modifying a phenol resin may be any resin, as long as it gives plasticity to the phenol resin, and crosslinked natural rubber and synthetic rubber are exemplified. As the elastomer for modifying the phenol resin, acrylic rubber, silicone rubber or the like is preferably used. The elastomer-modified phenol resins may be used either alone or as a combination of two or more thereof.

In the present invention, the binder is used usually in an amount of 10 to 20% by volume in the whole friction material, and preferably in an amount of 13 to 17% by volume.

[Friction Modifier]

In the friction material in the present invention, a friction modifier which is usually used can be used, and examples thereof include organic fillers, inorganic fillers and abrasives.

(Organic Filler)

Examples of the organic fillers include, for example, various kinds of rubber such as acrylonitrile-butadiene rubber (NBR), styrene-butadiene rubber (SBR), and butadiene rubber (BR) and the like, tire tread, organic dust such as rubber dust and cashew dust, polytetrafluoroethylene (PTFE) and the like.

The content of the organic filler is preferably from 3 to 10% by volume in the friction material.

(Inorganic Filler)

Examples of the inorganic fillers include, for example, metal powders (excluding zinc) such as tin, vermiculite, mica, calcium hydroxide, barium sulfate, calcium carbonate, natural graphite, scale-like graphite, elastic graphite, expanded graphite, graphite coke, plate-like, scale-like or powdery potassium titanate, lithium potassium titanate, magnesium potassium titanate and the like.

The content of the inorganic filler is preferably from 30 to 55% by volume.

In addition, the total amount of the fillers including the organic filler and the inorganic filler is preferably from 30 to 65% by volume in the friction material.

(Abrasive)

The smaller the particle diameter of the abrasive is, the milder the abrasive becomes. However, when it is too small, a role as the abrasive is not played. On the other hand, the larger the particle diameter is, the more the counterpart material is ground to improve the friction coefficient. However, when it is too large, the counterpart material is excessively ground. The particle diameter or the content thereof is adjusted depending on the kind, shape or Mohs hardness of the abrasive.

When an abrasive having a Mohs hardness of 7 or more is used as the abrasive, the high friction coefficient required in braking at high speed and high load is obtained. Examples of the abrasives having a Mohs hardness of 7 or more include, for example, alumina, silica, silicon carbide, mullite, stabilized zirconia, zirconium silicate and the like, and such abrasives have a role of grinding the counterpart material to improve the friction coefficient.

Among these, at least one of stabilized zirconia and zirconium silicate is preferably used as the abrasive from the standpoint of obtaining the high friction coefficient required in braking at high speed and high load. These abrasives may be used either alone or as a combination of two or more thereof.

The abrasive having a Mohs hardness of 7 or more is contained preferably in an amount of 1 to 10% by volume based on the friction material, and more preferably in an amount of 1 to 6% by volume based on the friction material. Within this range, the friction coefficient during braking at high speed and high load can be improved to decrease the counterpart material attacking properties.

The abrasive having a Mohs hardness of 7 or more preferably has an average particle diameter of 3 to 20 μm. Within this range, the friction coefficient during braking at high speed and high load can be improved to decrease the counterpart material attacking properties.

Further, an abrasive having a Mohs hardness of less than 7 is preferably used as the abrasive from the standpoint of a balance between the friction coefficient (effectiveness) and the counterpart material attacking properties. Examples of the abrasives having a Mohs hardness of less than 7 include triiron tetraoxide, magnesia, chromite and the like.

The abrasive having a Mohs hardness of less than 7 is contained preferably in an amount of 1 to 10% by volume based on the friction material, and more preferably in an amount of 1 to 7% by volume based on the friction material.

The content of the whole abrasive is usually from 2 to 20% by volume in the friction material, and preferably from 4 to 13% by volume in the friction material.

[Fiber Base Material]

In the friction material in the present invention, a fiber base material usually used, other than the metal fiber, can be used, and examples thereof include organic fibers and inorganic fibers other than the bio-soluble inorganic fiber.

(Organic Fiber and Inorganic Fiber)

Examples of the organic fibers include aromatic polyamide (aramid) fiber, cellulose fiber, polyacrylic fiber and the like. Above all, the aramid fiber is preferred from the standpoint of matrix strength of the friction material.

Examples of the inorganic fibers other than the bio-soluble inorganic fiber include potassium titanate fiber, glass fiber, carbon fiber, rock wool and the like.

The above-mentioned fiber base materials may be used either alone or as a combination of two or more thereof. In addition, the total content of the fiber base materials other than the bio-soluble inorganic fiber is usually from 1 to 35% by volume in the friction material, and preferably from 5 to 30% by volume in the friction material.

<Production Method of Friction Material>

The friction material of the present invention can be produced by blending the above-mentioned respective components, preforming the resulting blend according to an ordinary manufacturing method, and performing treatments such as thermoforming, heating and grinding.

A friction pad (brake pad) including the above-mentioned friction material can be produced by the following steps (1) to (5):

(1) a step of forming a steel plate (pressure plate) into a predetermined shape by a sheet-metal press, (2) a step of subjecting the steel plate formed into the predetermined shape to degreasing treatment, chemical treatment and primer treatment, and coating it with an adhesive, (3) a step of performing pressure forming of a raw material mixture of the friction material to produce a preformed product, (4) a step of thermoforming the pressure plate which has passed through the above-mentioned steps (1) and (2) and the above-mentioned preformed body of the friction material which has passed through the above-mentioned step (3), at a predetermined temperature and pressure in a thermoforming step to integrally fix both members, and (5) a step of performing aftercuring after the above-mentioned step (4), and finally performing finishing treatments such as grinding, scorching and coating.

EXAMPLES

The present invention is specifically described below by examples. However, the present invention should not be limited to these examples alone.

Examples 1 to 16 and Comparative Examples 1 to 4

Blending materials of each friction material were uniformly mixed in a mixer based on the blending composition (% by volume) shown in Table 2 to obtain each friction material mixture. Subsequently, the friction material mixture was preformed at room temperature and a pressure of 20 MPa for 10 seconds to obtain a preformed product. The preformed product was put in a thermoforming mold, and a metal plate (pressure plate: P/P) previously coated with an adhesive was laminated thereon, followed by thermocompression forming at a temperature of 150° C. and a forming surface pressure of 40 MPa for 5 minutes. The thermocompression formed product was heat-treated at a temperature of 150 to 300° C. for 1 to 4 hours, and ground and coated to a predetermined thickness. Thus, friction pads containing the friction materials in Examples 1 to 16 and Comparative Examples 1 to 4 were obtained.

In Examples and Comparative Examples, the bio-soluble inorganic fiber having a fiber diameter of 4 μm and containing 27% by weight of shots having a particle diameter of 45 μm or more, which was prepared from a raw stock of $Al_2O_3$—$SiO_2$—$ZrO_2$—$K_2O$-based Superwool (registered trade mark) fiber (manufactured by Morgan Advanced Materials PLC, see WO2015/011439), was used.

In addition, the zinc powder had an average particle diameter of 5 μm.

<Evaluation Methods>

(1) Friction Properties Evaluation

Friction properties evaluation was performed in accordance with JASO C406 (general performance test). In the friction properties evaluation, a 1/7 scale tester (inertia: 1.5 kg·m$^2$) was used, and an average friction coefficient μ of the second effectiveness 100 (km/hour) was determined. The results thereof are shown in Table 2.

In the evaluation of Table 2, the case where the average friction coefficient μ of the second effectiveness 100 (km/hour) was more than 0.45 was evaluated as A, the case where it was more than 0.40 and 0.45 or less was evaluated as B, and the case where it was 0.40 or less was evaluated as C.

(2) High Load Braking Test

After the above-mentioned friction properties evaluation (1) was performed, the inertia was set to 2.5 kg·m², and a high load braking test 1 was performed after burnishing, based on the following conditions in Table 1. Thereafter, the temperature of a disc rotor was cooled to 100° C. or lower, and a high load braking test 2 was performed after temperature rising braking. The minimum instant friction coefficient μ (disc rotor initial temperature: 100° C., minimum instant μ) in the high load braking test 1, the minimum instant friction coefficient μ (disc rotor initial temperature: 200° C., minimum instant μ) in the high load braking test 2 and the pad wear amount (pad wear amount [mm] after JASO-C406+high load braking) are each shown in Table 2.

In the evaluation of Table 2, the case where the minimum instant friction coefficient μ was more than 0.20 was evaluated as A, the case where it was from more than 0.15 and 0.20 or less was evaluated as B, and the case where it was 0.15 or less was evaluated as C. Further, the case where the pad wear amount was −30% or less based on the pad wear amount of Comparative Example 1 was evaluated as A, the case where it was −30% or more and +10% or less was evaluated as B, and the case where it was more than +10% was evaluated as C. The friction material in the friction pad of Comparative Example 1 used as an evaluation reference contains copper fiber, and the blending composition thereof corresponds to a blending composition which has been conventionally generally used as a friction material of a NAO (Non-Asbestos Organic) material.

TABLE 1

| | Initial speed [km/h] | Final speed [km/h] | Control | | Disc rotor braking initial temperature [° C.] | Number of braking times [times] |
|---|---|---|---|---|---|---|
| | | | Deceleration [m/s²] | Hydraulic pressure [MPa] | | |
| Burnishing | 50 | 3 | 2.94 | — | 100 | 100 |
| High load braking test 1 | 160 | 3 | — | 14 | 100 | 1 |
| Temperature rising braking | 50 | 3 | 2.94 | — | — | 3 |
| High load braking test 2 | 160 | 3 | — | 14 | 200 | 1 |

(3) Low Pressure Wear Rotor Kindness Test

A test piece was cut out from the friction pad. The test piece was pressed to a disc rotor at a surface pressure of 0.06 MPa, and this test was performed at a speed of 60 km/hour, by using the 1/7 scale tester. The rotor wear amount (μm) after 40 hours in this case was measured. FC200 was used as the disc rotor.

In the evaluation of Table 2, the case where the rotor wear amount (low pressure wear rotor kindness test [μm], 0.06 [MPa]) was 15 μm or less was evaluated as A, the case where it was more than 15 μm and 20 μm or less was evaluated as B, and the case where it was more than 20 μm was evaluated as C.

The blending compositions of Examples 1 to 16 and Comparative Examples 1 to 4 and the evaluation results of the above (1) to (3) are shown in Table 2.

TABLE 2

| | | Example | | | | | | | | | | | | | | | | Comparative Example | | | |
|---|---|---|---|---|---|---|---|---|---|---|---|---|---|---|---|---|---|---|---|---|---|
| | (% by volume) | 1 | 2 | 3 | 4 | 5 | 6 | 7 | 8 | 9 | 10 | 11 | 12 | 13 | 14 | 15 | 16 | 1 | 2 | 3 | 4 |
| Blending Composition | Binder | | | | | | | | | | | | | | | | | | | | |
| | Straight phenol resin | 15 | 15 | 15 | 15 | 15 | 15 | 15 | 15 | 15 | 15 | 15 | 15 | 15 | 15 | 15 | 15 | 15 | 15 | 15 | 15 |
| | Friction Modifier | | | | | | | | | | | | | | | | | | | | | |
| | Cashew dust | 6 | 6 | 6 | 6 | 6 | 6 | 6 | 6 | 6 | 6 | 6 | 6 | 6 | 6 | 6 | 6 | 6 | 6 | 6 | 6 |
| | Tire tread | 2 | 2 | 2 | 2 | 2 | 2 | 2 | 2 | 2 | 2 | 2 | 2 | 2 | 2 | 2 | 2 | 2 | 2 | 2 | 2 |
| | Barium sulfate | 16.5 | 25.5 | 7.5 | 19.5 | 13.5 | 16.5 | 19.5 | 13.5 | 16.5 | 16.5 | 16.5 | 16.5 | 16.5 | 17.8 | 15 | 18 | 27 | 32.5 | 28.5 | 20.5 |
| | Potassium titanate | 10 | 10 | 10 | 10 | 10 | 10 | 10 | 10 | 10 | 10 | 10 | 10 | 10 | 10 | 10 | 10 | 10 | 10 | 10 | 10 |
| | Calcium hydroxide | 3 | 3 | 3 | 3 | 3 | 3 | 3 | 3 | 3 | 3 | 3 | 3 | 3 | 3 | 3 | 3 | 3 | 3 | 3 | 3 |
| | Mica | 2 | 2 | 2 | 2 | 2 | 2 | 2 | 2 | 2 | 2 | 2 | 2 | 2 | 2 | 2 | 2 | 2 | 2 | 2 | 2 |
| | Graphite | 10 | 10 | 10 | 10 | 10 | 10 | 10 | 10 | 10 | 10 | 10 | 10 | 10 | 10 | 10 | 10 | 10 | 10 | 10 | 10 |
| | Zirconium silicate | 4 | 4 | 4 | 4 | 4 | 4 | 4 | 4 | 4 | 4 | 4 | 4 | 4 | 4 | 4 | 4 | 4 | 4 | 4 | 4 |
| | Triiron tetraoxide | 7 | 7 | 7 | 7 | 7 | 7 | 7 | 7 | 7 | 7 | 7 | 7 | 7 | 7 | 7 | 7 | 7 | 7 | 7 | 7 |
| | Tin sulfide | 4 | 4 | 4 | 1 | 7 | 0 | 0 | 0 | 0 | 0 | 2 | 0 | 4 | 4 | 4 | 4 | 0 | 4 | 4 | 0 |
| | Bismuth sulfide | 0 | 0 | 0 | 0 | 0 | 4 | 1 | 0 | 0 | 0 | 2 | 0 | 0 | 0 | 0 | 0 | 0 | 0 | 0 | 0 |
| | Molybdenum disulfide | 0 | 0 | 0 | 0 | 0 | 0 | 0 | 7 | 0 | 0 | 0 | 2 | 1 | 0 | 0 | 0 | 0 | 0 | 0 | 0 |
| | Antimony trisulfide | 0 | 0 | 0 | 0 | 0 | 0 | 0 | 0 | 4 | 4 | 0 | 2 | 1 | 0 | 0 | 0 | 0 | 0 | 0 | 0 |
| | Zinc powder | 1.5 | 1.5 | 1.5 | 1.5 | 1.5 | 1.5 | 1.5 | 1.5 | 1.5 | 1.5 | 1.5 | 1.5 | 1.5 | 0.2 | 3 | 0 | 4 | 1.5 | 1.5 | 1.5 |
| | Fiber base material | | | | | | | | | | | | | | | | | | | | | |
| | Bio-soluble inorganic fiber | 16 | 7 | 25 | 16 | 16 | 16 | 16 | 16 | 16 | 16 | 16 | 16 | 16 | 16 | 16 | 16 | 4 | 0 | 4 | 16 |
| | Copper fiber | 0 | 0 | 0 | 0 | 0 | 0 | 0 | 0 | 0 | 0 | 0 | 0 | 0 | 0 | 0 | 0 | 7 | 0 | 0 | 0 |
| | Aramid fiber | 3 | 3 | 3 | 3 | 3 | 3 | 3 | 3 | 3 | 3 | 3 | 3 | 3 | 3 | 3 | 3 | 3 | 3 | 3 | 3 |
| | Total | 100 | 100 | 100 | 100 | 100 | 100 | 100 | 100 | 100 | 100 | 100 | 100 | 100 | 100 | 100 | 100 | 100 | 100 | 100 | 100 |
| JASO-C406 | Second effectiveness 100 [km/h] average μ | 0.47 | 0.43 | 0.48 | 0.46 | 0.43 | 0.47 | 0.46 | 0.42 | 0.46 | 0.45 | 0.45 | 0.45 | 0.46 | 0.47 | 0.41 | 0.47 | 0.46 | 0.36 | 0.39 | 0.46 |
| High load braking | Disc rotor initial temperature 100° C., minimum instant μ | 0.26 | 0.24 | 0.27 | 0.23 | 0.27 | 0.26 | 0.24 | 0.27 | 0.26 | 0.25 | 0.26 | 0.25 | 0.27 | 0.26 | 0.22 | 0.26 | 0.28 | 0.14 | 0.16 | 0.15 |
| | Disc rotor initial temperature 200° C., minimum instant μ | 0.23 | 0.22 | 0.25 | 0.17 | 0.24 | 0.24 | 0.19 | 0.24 | 0.23 | 0.22 | 0.24 | 0.21 | 0.22 | 0.25 | 0.17 | 0.25 | 0.25 | 0.12 | 0.14 | 0.13 |
| | Pad wear amount [mm] after JASO-C406 + high load braking | 0.62 | 0.95 | 0.55 | 1.00 | 0.60 | 0.61 | 0.97 | 0.59 | 0.64 | 0.55 | 0.63 | 0.61 | 0.60 | 0.97 | 0.88 | 1.00 | 0.92 | 3.43 | 1.52 | 1.21 |
| | Low pressure wear rotor kindness test [μm], 0.06 [MPa] | 13 | 11 | 19 | 16 | 17 | 12 | 15 | 17 | 14 | 13 | 12 | 14 | 14 | 14 | 13 | 16 | 11 | 8 | 12 | 16 |
| Evaluation | Second effectiveness 100 [km/h], average μ | A | B | A | A | B | A | A | B | A | B | B | B | A | A | B | A | A | C | C | A |
| | Disc rotor initial temperature 100° C., minimum instant μA | A | A | A | A | A | A | A | A | A | A | A | A | A | A | A | A | A | C | C | C |
| | Disc rotor initial temperature 200° C., minimum instant μA | A | B | B | B | B | A | B | B | A | A | A | A | A | B | B | B | A | C | B | C |
| | Pad wear | A | A | A | B | A | A | A | A | A | A | A | A | A | B | A | A | — | C | C | C |
| | Low pressure wear rotor kindness test | A | A | B | B | B | A | B | B | A | A | A | A | A | A | A | B | A | A | A | B |

As shown in Comparative Examples 2 to 4, when the copper component is eliminated from the friction material (Comparative Example 1) contained in the conventional friction pad, even in the case where only the metal sulfide is contained (Comparative Example 2) and even in the case where only the bio-soluble inorganic fiber is contained (Comparative Example 4), the friction coefficient during braking at high load is low, and further, when the content of the bio-soluble inorganic fiber is 4% by volume, even in the case where both the bio-soluble inorganic fiber and the metal sulfide are contained (Comparative Example 3), the friction coefficient during braking at high load is low.

However, even in the case where no copper component is contained, the friction coefficient during braking at high load is improved by containing the bio-soluble inorganic fiber in an amount of 7% by volume or more and the metal sulfide (see Examples 2, 4 and 7). Further, the minimum instant friction coefficient in the case of particularly high load such as a disc rotor initial temperature of 200° C. is good by increasing the content of the metal sulfide (see Examples 1 and 4).

In addition, the counterpart material attacking property is low by containing zinc (see Examples 14 and 16).

From the above, it has been found that even the friction material containing no copper component and no metal fiber can achieve both the extremely good friction coefficient and abrasion resistance during braking under higher-temperature and higher-speed conditions by containing the bio-soluble inorganic fiber in an amount of 7% by volume or more and the metal sulfide.

While the present invention has been described in detail and with reference to specific embodiments thereof, it will be apparent to those skilled in the art that various changes and modifications can be made therein without departing from the spirit and scope of the present invention. This application is based on Japanese Patent Application No. 2015-231594 filed on Nov. 27, 2015, the contents of which are incorporated herein by reference.

INDUSTRIAL APPLICABILITY

The friction material in the present invention is a friction material with low environmental load, because of containing no copper component and no metal fiber. Further, in spite of containing no copper component, the friction material can achieve both good friction coefficient and abrasion resistance during braking under higher-temperature and higher-speed conditions. It is therefore particularly useful to apply the friction material in the present invention to brake pads or brake linings, clutches and the like to be used for automobiles, railway vehicles, industrial machines and the like, and its technical meaning is extremely significant.

The invention claimed is:

1. A friction material comprising:
    a bio-soluble inorganic fiber in one of i) an amount of 7% by volume or more or ii) an amount of 6% by weight or more, wherein the bio-soluble inorganic fiber includes $Al_2O_3$—$SiO_2$—$ZrO_2$—$K_2O$—based fiber; and
    a metal sulfide,
    wherein the friction material comprises a content of a copper component of 0.5% by weight or less and a content of metal fiber of 0.5% by weight or less.

2. The friction material according to claim 1, further comprising zinc.

3. The friction material according to claim 1, wherein an amount of a shot having a particle diameter of 45 μm or more in the bio-soluble inorganic fiber is present and in an amount of 30% by weight or less.

4. The friction material according to claim 1, wherein the metal sulfide is at least one kind selected from the group consisting of tin sulfide, bismuth sulfide, molybdenum disulfide and antimony trisulfide.

5. The friction material according to claim 2, wherein an amount of a shot having a particle diameter of 45 μm or more in the bio-soluble inorganic fiber is present and in an amount of 30% by weight or less.

6. The friction material according to claim 2, wherein the metal sulfide is at least one kind selected from the group consisting of tin sulfide, bismuth sulfide, molybdenum disulfide and antimony trisulfide.

7. The friction material according to claim 3, wherein the metal sulfide is at least one kind selected from the group consisting of tin sulfide, bismuth sulfide, molybdenum disulfide and antimony trisulfide.

8. The friction material according to claim 5, wherein the metal sulfide is at least one kind selected from the group consisting of tin sulfide, bismuth sulfide, molybdenum disulfide and antimony trisulfide.

* * * * *